(12) United States Patent
Nishii et al.

(10) Patent No.: US 12,208,467 B2
(45) Date of Patent: Jan. 28, 2025

(54) WELDING METHOD AND WELDING APPARATUS

(71) Applicant: FURUKAWA ELECTRIC CO., LTD., Tokyo (JP)

(72) Inventors: Ryosuke Nishii, Tokyo (JP); Kousuke Kashiwagi, Tokyo (JP); Takashi Kayahara, Tokyo (JP); Tomomichi Yasuoka, Tokyo (JP); Takashi Shigematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 898 days.

(21) Appl. No.: 17/115,013

(22) Filed: Dec. 8, 2020

(65) Prior Publication Data

US 2021/0086295 A1 Mar. 25, 2021

Related U.S. Application Data

(63) Continuation of application No. PCT/JP2019/025007, filed on Jun. 24, 2019.

(30) Foreign Application Priority Data

Jun. 22, 2018 (JP) ................................. 2018-119177

(51) Int. Cl.
*B23K 26/067* (2006.01)
*B23K 26/06* (2014.01)
*B23K 26/21* (2014.01)

(52) U.S. Cl.
CPC ........ *B23K 26/067* (2013.01); *B23K 26/0648* (2013.01); *B23K 26/21* (2015.10)

(58) Field of Classification Search
CPC .. B23K 26/067; B23K 26/21; B23K 26/0648; B23K 26/703; B23K 26/082;
(Continued)

(56) References Cited

U.S. PATENT DOCUMENTS 6,433,303 B1 8/2002 Liu et al.
6,608,278 B1 * 8/2003 Xie ...................... B23K 26/244
219/121.64
(Continued)

FOREIGN PATENT DOCUMENTS

CN 1248933 A 3/2000
CN 101011779 A 8/2007
(Continued)

OTHER PUBLICATIONS

Korean Office Action issued on Jan. 5, 2023 in Korean Patent Application No. 10-2020-7036592 (with unedited computer-generated English translation), citing reference 15 therein, 9 pages.

(Continued)

*Primary Examiner* — Phuong T Nguyen
(74) *Attorney, Agent, or Firm* — Oblon, McClelland, Maier & Neustadt, L.L.P.

(57) ABSTRACT

A welding method includes: disposing a workpiece formed by stacking a plurality of metal foils in an area to be irradiated with laser light that contains a plurality of beams; irradiating a surface of the workpiece with the beams of the laser light by dispersing positions of the beams such that centers of the beams do not overlap with each other within a prescribed area on the surface; melting an irradiated part of the workpiece and performing welding; and setting each of the beams to have a power density with which no hole opens in the metal foils, and setting the power density of the beams and dispersing irradiating positions to be emitted so as to form a weld pool penetrating the workpiece by the beams.

8 Claims, 14 Drawing Sheets

(58) Field of Classification Search
CPC ........ B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40
USPC .......... 219/121.63, 121.64, 121.72, 136, 119
See application file for complete search history.

(56) References Cited

U.S. PATENT DOCUMENTS

| | | |
|---|---|---|
| 2001/0017291 A1 | 8/2001 | Bishop |
| 2004/0200813 A1 | 10/2004 | Alips et al. |
| 2012/0187099 A1 | 7/2012 | Gubler et al. |
| 2015/0136840 A1 | 5/2015 | Zhao et al. |
| 2015/0360320 A1 | 12/2015 | Yoshida et al. |
| 2017/0182599 A1 | 6/2017 | Tsukui |
| 2017/0334021 A1 | 11/2017 | Tsukui |
| 2018/0147660 A1 | 5/2018 | Scherbakov et al. |

FOREIGN PATENT DOCUMENTS

| | | | |
|---|---|---|---|
| CN | 201371340 | Y | 12/2009 |
| CN | 102476242 | A | 5/2012 |
| CN | 102642084 | A | 8/2012 |
| CN | 105171239 | A | 12/2015 |
| CN | 205587848 | U | 9/2016 |
| CN | 106413972 | A | 2/2017 |
| CN | 106925887 | A | 7/2017 |
| CN | 107427960 | A | 12/2017 |
| CN | 107666982 | A | 2/2018 |
| JP | 1-306085 | A | 12/1989 |
| JP | 2000-233289 | A | 8/2000 |
| JP | 2001-71162 | A | 3/2001 |
| JP | 2003-290965 | A | 10/2003 |
| JP | 2010-135651 | A | 6/2010 |
| JP | 2012-96269 | A | 5/2012 |
| JP | 2014-136242 | A | 7/2014 |
| JP | 2014-140890 | A | 8/2014 |
| JP | 2015-205327 | A | 11/2015 |
| JP | 2015-217422 | A | 12/2015 |
| JP | 2016-30280 | A | 3/2016 |
| JP | 2016-119377 | A | 6/2016 |
| JP | 2017-113785 | A | 6/2017 |
| JP | 2018-51607 | A | 4/2018 |
| KR | 10-2006-0061123 | A | 6/2006 |
| TW | 498007 | B | 8/2002 |
| WO | WO 2017/110247 | A1 | 6/2017 |

OTHER PUBLICATIONS

Chinese Office Action issued on Apr. 26, 2023 in Chinese Application No. 201980041174.3 (English translation of the cover page and unedited computer generated English translation of the office action), 23 pages.

Combined Chinese Office Action and Search Report issued Nov. 18, 2022, in corresponding Chinese Patent Application No. 201980041174.3 (with English Translation and English Translation of Category of Cited Documents) citing documents 15-17 therein, 22 pages.

International Search Report issued Sep. 10, 2019 in PCT/JP2019/025007 filed Jun. 24, 2019, citing documents AO-AQ therein, 1 page.

Combined Chinese Office Action and Search Report issued Jan. 30, 2022 in Chinese Patent Application No. 201980041174.3 (with English translation), citing documents AA-AC and AL-AX therein, 22 pages.

Extended European Search Report issued Feb. 16, 2022 in European Patent Application No. 19822704.3, citing documents BO and BR therein, 8 pages.

Office Action issued Feb. 23, 2024, in corresponding European Patent Application No. 19 822 704.3, citing document 15 therein, 8 pages.

* cited by examiner

| SURFACE | BACK SURFACE |
|---|---|
|  | |

| SURFACE | BACK SURFACE |
|---|---|
|  | |

| SURFACE | BACK SURFACE |
|---|---|
|  | |

WELDING METHOD AND WELDING APPARATUS

CROSS-REFERENCE TO RELATED APPLICATION(S)

This application is a continuation of International Application No. PCT/JP2019/025007, filed on Jun. 24, 2 2019 which claims the benefit of priority of the prior Japanese Patent Application No. 2018-119177, filed on Jun. 22, 2018, the entire contents of which are incorporated herein by reference.

BACKGROUND

The present disclosure relates to a welding method and a welding apparatus.

As a method for welding a workpiece made of a metallic material, there is known laser welding. Laser welding is a welding method in which a welding part of the workpiece is irradiated with laser light so as to melt the welding part with the energy of the laser light. A liquid pool of the melted metallic material called a weld pool is formed in the welding part irradiated with the laser light, and the weld pool is solidified thereafter for performing welding.

Meanwhile, laminated and welded metal foils are used in various technical fields. For example, laminated and welded copper foils are used as electrodes of lithium ion batteries. In regards to lap welding of metal foils, a welding technique with stable quality is broadly desired. As a technique regarding lap welding of metal foils, there is a technique disclosed in Japanese Laid-open Patent Publication No. 2014-136242, for example.

SUMMARY

There is a need for providing a welding method and a welding apparatus capable of achieving lap welding with higher quality.

According to an embodiment, a welding method includes: disposing a workpiece formed by stacking a plurality of metal foils in an area to be irradiated with laser light that contains a plurality of beams; irradiating a surface of the workpiece with the beams of the laser light by dispersing positions of the beams such that centers of the beams do not overlap with each other within a prescribed area on the surface; melting an irradiated part of the workpiece and performing welding; and setting each of the beams to have a power density with which no hole opens in the metal foils, and setting the power density of the beams and dispersing irradiating positions to be emitted so as to form a weld pool penetrating the workpiece by the beams.

According to an embodiment, a welding apparatus includes: a laser device; and an optical head that emits laser light output from the laser device toward a workpiece to melt an irradiated part of the workpiece and perform welding. Further, the workpiece is formed by stacking a plurality of metal foils, the laser light emitted to the workpiece contains a plurality of beams, and emitted to a surface of the workpiece by dispersing positions such that centers of the beams do not overlap with each other within a prescribed area on the surface, and each of the beams is set to have a power density with which no hole opens in the metal foils, and the power density of the beams is set and irradiating positions are dispersed to be emitted so as to form a weld pool penetrating the workpiece by the beams.

DETAILED DESCRIPTION

Figure 1:
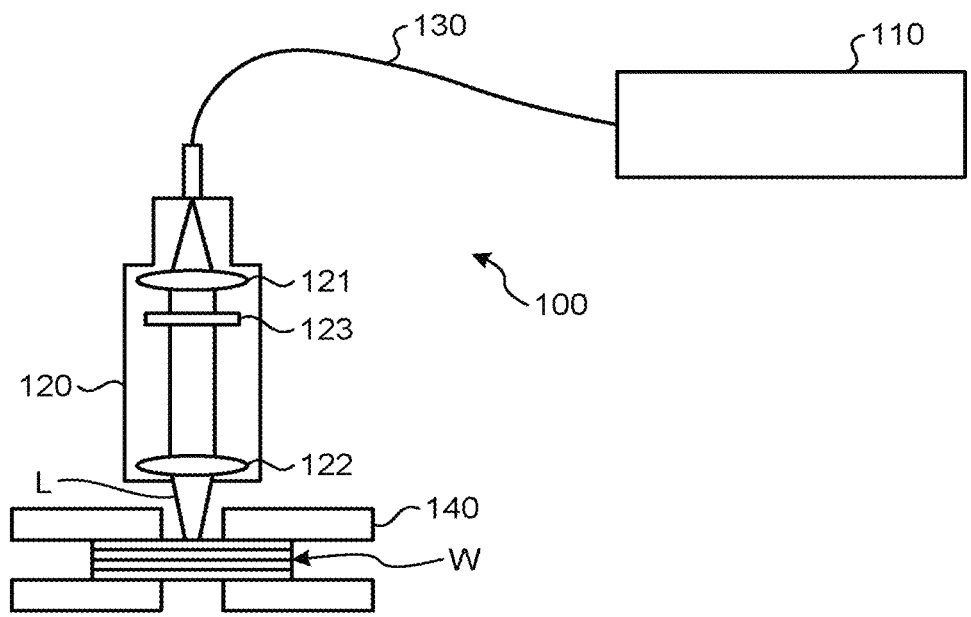
FIG. 1 is a schematic diagram illustrating a schematic configuration of a laser welding apparatus according to a first embodiment.

In the related art, since metal foils are extremely thin, when metal foils are lap-welded by laser welding, a hole, a tear, and the like may be generated in the metal foils if the power density of laser light is too high so that a damage of more than an acceptable level may be caused. Meanwhile, if the power density of the laser light is too low, the energy of the laser light may not reach the lowermost layer of the stacked metal foils, so that the welding process may not be proceeded. Such phenomena may become the cause for deteriorating the quality of welding.

Hereinafter, embodiments of the present invention will be described in detail by referring to the accompanying drawings. It is to be noted that the present invention is not limited to the embodiments described hereinafter. Furthermore, in the drawings, same reference signs are applied to the same or corresponding elements as appropriate.

First Embodiment

FIG. 1 is a schematic diagram illustrating a schematic configuration of a laser welding apparatus according to the first embodiment. A laser welding apparatus 100 includes a laser device 110, an optical head 120, an optical fiber 130 that connects the laser device 110 and the optical head 120, and a fixing device 140. A workpiece W is formed by stacking a plurality of metal foils. While the thickness of each metal foil is 2 µm to 20 µm, for example, it is not specifically limited. Furthermore, while there are 10 to 100 pieces of metal foils, for example, the number thereof is not specifically limited. While the metal foils include copper or aluminum, there is no specific limit set for the materials of the metal foils.

The laser device 110 is configured to be able to output laser light with the power of several kW, for example. For example, the laser device 110 may include a plurality of semiconductor laser elements on the inside thereof so as to be able to output multi-mode laser light of several kW as the total output of the semiconductor laser elements. Furthermore, the laser device 110 may include various kinds of laser light sources such as a fiber laser, a YAG laser, and a disk laser. The optical fiber 130 guides the laser light output from the laser device 110 to be input to the optical head 120. The fixing device 140 is a device that fixes the workpiece W by sandwiching it from a surface side and a back surface side. Note here that the surface side is a main surface side to which the laser light is emitted. The fixing device 140 has an opening such as a hole or a groove such that an area of the workpiece planned to be irradiated with the laser light and the periphery thereof can be exposed. As for the fixing device 140, it is preferable to be able to fix the workpiece W without having a gap between the metal foils as much as possible.

The optical head 120 is an optical device for emitting laser light input from the laser device 110 toward the workpiece W. The optical head 120 includes a collimating lens 121 and a condenser lens 122. The collimating lens 121 is an optical system for making the input laser light into collimated light. The condenser lens 122 is an optical system for collecting the collimated laser light and emitting it as laser light L to the workpiece W.

The optical head 120 is configured to be able to change the relative position with respect to the workpiece W in order to sweep the laser light L while irradiating the workpiece W with the laser light L. Methods for changing the relative position with respect to the workpiece W include moving the optical head 120 itself, moving the workpiece W, and the like. That is, the optical head 120 may be configured to be able to sweep the laser light L for the fixed workpiece W. Alternatively, the irradiating position of the laser light L from the optical head 120 may be fixed, and the workpiece W may be held to be movable with respect to the fixed laser light L.

Figure 2:
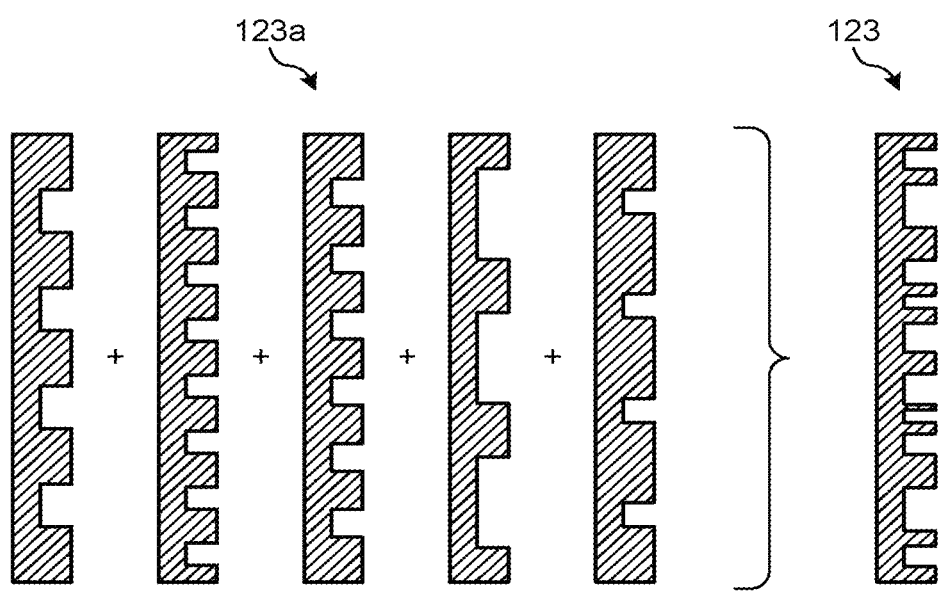
FIG. 2 is a schematic diagram for describing a diffractive optical element.

The optical head 120 includes a diffractive optical element 123 as an example of a beam shaper that is disposed between the collimating lens 121 and the condenser lens 122. The diffractive optical element 123 herein is, as conceptually illustrated in FIG. 2, an element in which a plurality of diffraction gratings 123a of different periods are integrated. The diffractive optical element 123 is capable of shaping a beam profile by bending or superposing the input laser light toward directions affected by each of the diffraction gratings. While the diffractive optical element 123 in the embodiment is disposed between the collimating lens 121 and the condenser lens 122, the diffractive optical element 123 may be placed on the optical fiber 130 side than the collimating lens 121 or may be placed on the workpiece W side than the condenser lens 122.

The diffractive optical element 123 divides the laser light input from the collimating lens 121 into a plurality of beams. Specifically, the diffractive optical element 123 divides the laser light such that the optical head 120 is able to irradiate the surface of the workpiece W with a plurality of beams by dispersing positions so that centers of the beams do not overlap with each other within a prescribed area on the surface.

Figure 3:
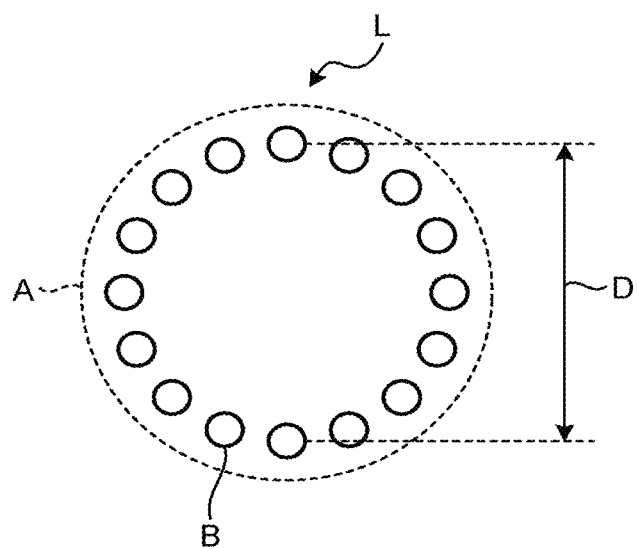
FIG. 3 is a schematic diagram for describing a plurality of beams.

FIG. 3 is a schematic diagram for describing a plurality of beams. The laser light L includes a plurality of beams B divided by the diffractive optical element 123. The diameter of a circle representing a beam B is the beam diameter. A circular area A is a prescribed area on the surface of the workpiece W. The area A of the workpiece W is irradiated with a plurality of (sixteen in the embodiment) beams B with positions thereof being dispersed such that the centers thereof do not overlap with each other within the area A. In the first embodiment, specifically, the beams B are arranged in a ring-like form of a diameter D within the area A. The area A is in a shape corresponding to an outer contour shape of layout of the beams B. Each of the beams B has a Gaussian power distribution in a radial direction of a beam cross-section thereof. Note, however, that the power distribution of the beam B is not limited to the Gaussian shape. The Gaussian shape in the current description is not limited to an accurate Gaussian shape but also includes shapes similar to the Gaussian shape.

The beam diameter of the beam B is defined as a diameter of an area including a peak and having an intensity equal to or larger than $1/e^2$ of a peak intensity. In a case of a beam not in a circular shape, length of the area having an intensity equal to or larger than $1/e^2$ of a peak intensity in the vertical direction with respect to a sweeping direction is defined as the beam diameter in the current description.

In a case of performing welding by using the laser welding apparatus 100, first, the workpiece W is disposed in an area to be irradiated with the laser light L. Subsequently, while irradiating the workpiece W with the laser light L including the beams B divided by the diffractive optical element 123, the laser light L and the workpiece W are relatively moved to sweep the laser light L so as to melt and weld the part irradiated with the laser light L in the workpiece W.

Described herein is a state where the laser light emitted to the surface of the workpiece W melts the workpiece W at the time of welding. Here, referring to FIGS. 4A to 4D, states of the laser light and melted states of the workpiece in four cases will be described. In FIGS. 4A to 4D, white arrows schematically illustrate transfer of the heat by the laser light.

Figure 4A:
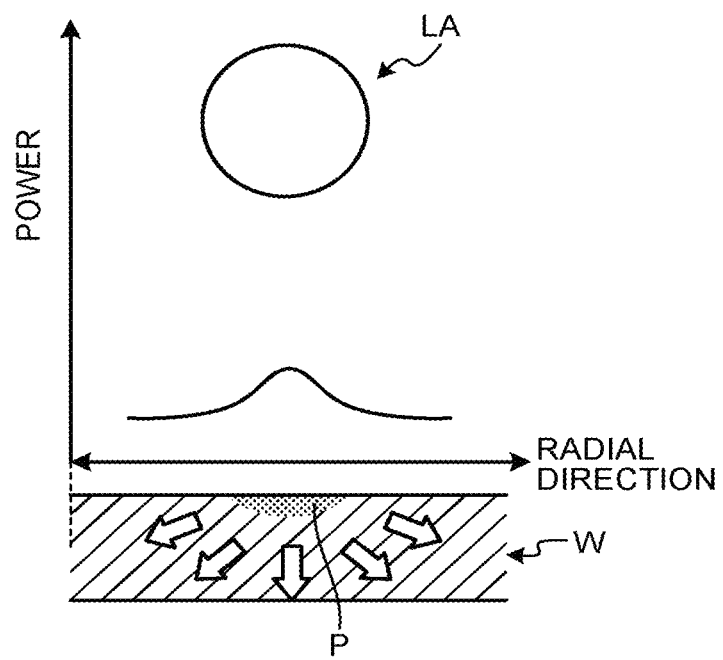
FIG. 4A is a schematic chart for describing a state of laser light and a melting state of a workpiece corresponding thereto.

As in FIG. 4A, considered is a case where the power distribution of laser light LA for welding is a Gaussian distribution, while the peak power is low and the power density at the peak is low. Such laser light LA can be achieved by emitting laser light in a defocus state to the workpiece W, for example. "Defocus" means to shift the condensing position of the laser light by the condenser lens of the optical head from the surface position of the workpiece W. In this case, when the laser light LA is emitted to the surface of the workpiece W, a weld pool P is formed in the workpiece W but no keyhole is formed. However, in this case, the power density of the laser light LA is low so that the weld pool P may not be expanded so much and the weld process may not be proceeded. However, when the defocus state is adjusted so as to increase the peak power for properly expanding the weld pool P, poor welding may tend to occur. Furthermore, in such a defocus state, there may be more energy not contributing to welding out of the energy applied by the laser light LA, which is inefficient. Therefore, it is difficult to perform welding in a preferable manner even if the laser light of the Gaussian distribution is set to be in a defocus state.

Figure 4B:
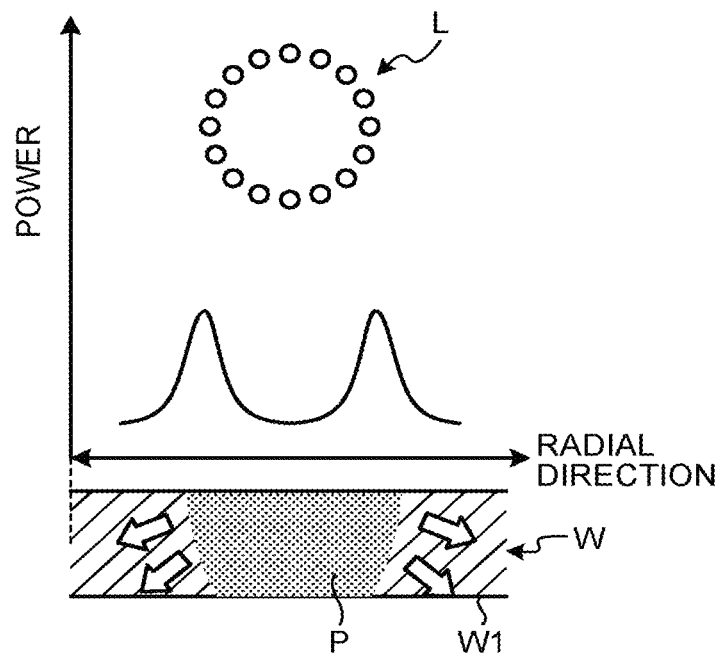
FIG. 4B is a schematic chart for describing a state of laser light and a melting state of a workpiece corresponding thereto.

In the meantime, with the laser light L as in FIG. 4B, even though each of the beams has a unimodal shape such as the Gaussian distribution, the peak power thereof is relatively low. As a result, it is possible to achieve the so-called heat conduction welding with which no keyhole is formed. Moreover, each of the beams has a higher power density than the case of FIG. 4A. Thus, it is relatively easy to expand the weld pool P more than the case of FIG. 4A and to reach a back surface W1 of the workpiece W. Note here that the back surface W1 is the face on the opposite side of the surface to which the laser light L is emitted. As a result, it is possible to achieve lap welding with higher quality for the workpiece W. With the laser light L as in FIG. 4B, there may be cases where keyholes are formed by each of the beams. However, by setting the laser light L such that the key holes become shallow and dispersed at a plurality of areas, heat conduction welding becomes dominant as a result.

Figure 4C:
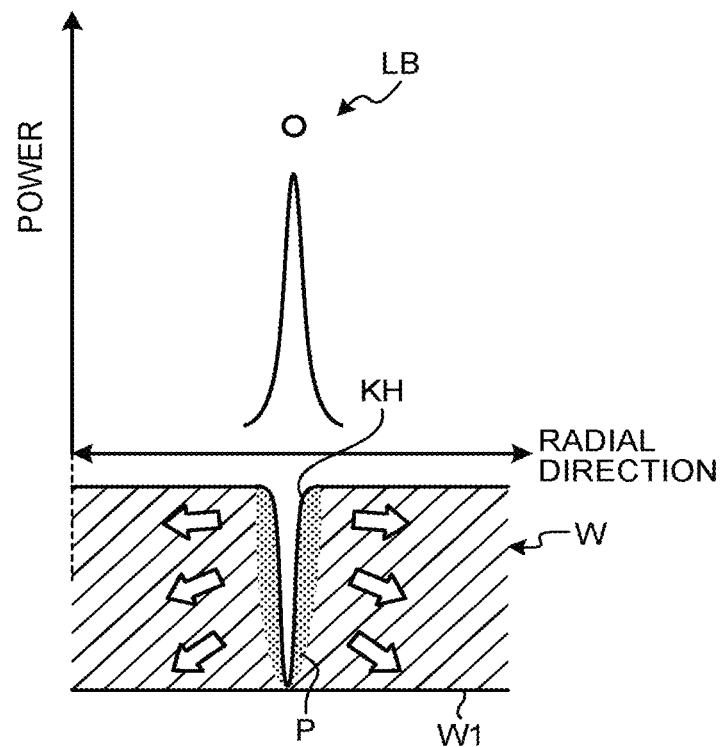
FIG. 4C is a schematic chart for describing a state of laser light and a melting state of a workpiece corresponding thereto.

Meanwhile, as in FIG. 4C, when the power distribution of laser light LB for welding is a Gaussian distribution with high peak power, the power density at the peak is high. In this case, when the laser light LB is emitted to the surface of the workpiece W as in FIG. 4C, the weld pool P and a keyhole KH are formed in the workpiece W, and the so-called keyhole welding becomes dominant. With the keyhole welding, there may be cases where the structural material of the workpiece W evaporates rapidly or scatters as spatter. As a result, the mass of the metal foils configuring the workpiece W is reduced, so that a hole or a tear may be generated in the metal foils, thereby causing poor welding. Furthermore, when the keyhole KH reaches near the back surface W1 of the workpiece W, there is less molten metal so that the metal foils may be torn and it becomes difficult to perform welding.

Figure 4D:
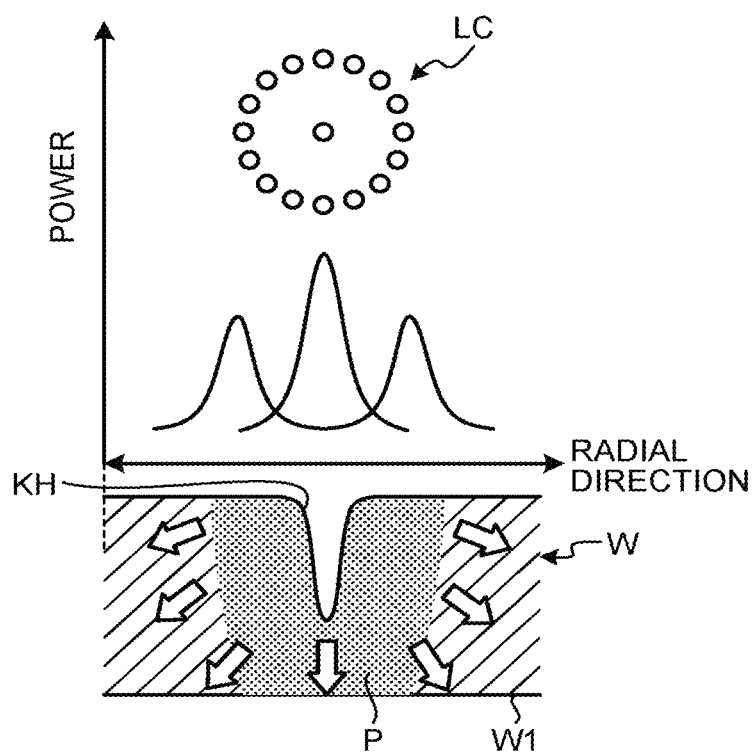
FIG. 4D is a schematic chart for describing a state of laser light and a melting state of a workpiece corresponding thereto.

FIG. 4D is a case of using laser light LC in a shape that further includes a beam in the center of a circle formed by the beams of the laser light L. In FIG. 4D, the weld pool P and the keyhole KH are formed in the workpiece W. For example, when the thickness of the workpiece W is thick or the like, while forming the keyhole KH of an appropriate size by the beam in the center to secure the depth (penetration depth) of the weld pool P, the metal foils of the workpiece W may be melted by the beams in the periphery thereof. This makes it possible to achieve welding without having a tear in the metal foils.

In order to achieve the state of heat conduction welding as illustrated in FIG. 4B or the state where heat conduction welding is dominant even though the keyhole KH is formed as illustrated in FIG. 4D, it is preferable to set each of the beams B to have the power density with which no hole opens in each of the metal foils configuring the workpiece W. Furthermore, it is preferable to set the power density of the beams B and to disperse the irradiating positions thereof so as to form the weld pool in the workpiece W through to the back surface W1 by the beams B. However, it is preferable to set the power density of the beams B, the irradiating positions, and the like such that the molten metal does not drop from the back surface W1 side.

Furthermore, it is preferable to set the number of the beams B, the peak power, and layout of the irradiating positions and to set the shape of the area A according to the characteristics (the material, thickness, the number of pieces to be stacked and the like of the metal foils) of the workpiece W. While it is possible to achieve lap welding with higher quality by setting at least one of those items, lap welding of still higher quality can be achieved stably without variations by setting two or more of those as appropriate in combination.

First Example

Twenty pieces of copper foils with a thickness of 8 μm were stacked to make a workpiece, and laser light was emitted thereto to perform laser welding. The laser light output from a laser device has a Gaussian distribution, and the wavelength thereof is 1070 nm. The power of the laser light was set as 600 W, 700 W, or 800 W. Then, the laser light was divided by a diffractive optical element into sixteen beams arranged in a ring-like form of 466 μm in diameter as illustrated in FIG. 3 and emitted to the workpiece. The sweeping speed of the laser light with respect to the workpiece was set as 3 mm/s, 5 mm/s, or 10 mm/s.

Figure 5:
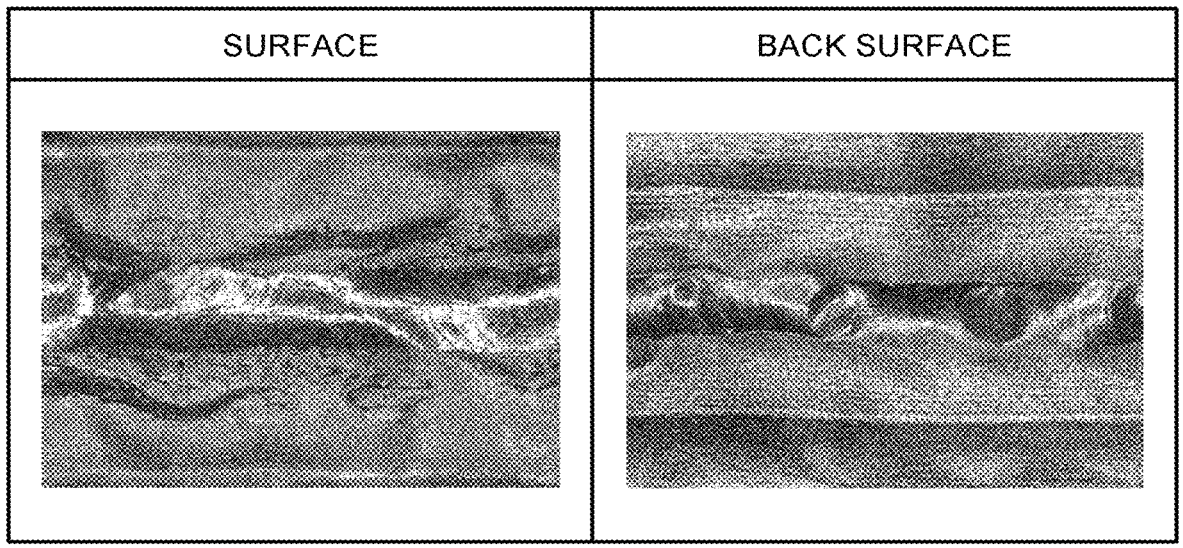
FIG. 5 is a picture of a surface and a back surface of lap-welded copper foils according to a first example.
Figure 6:
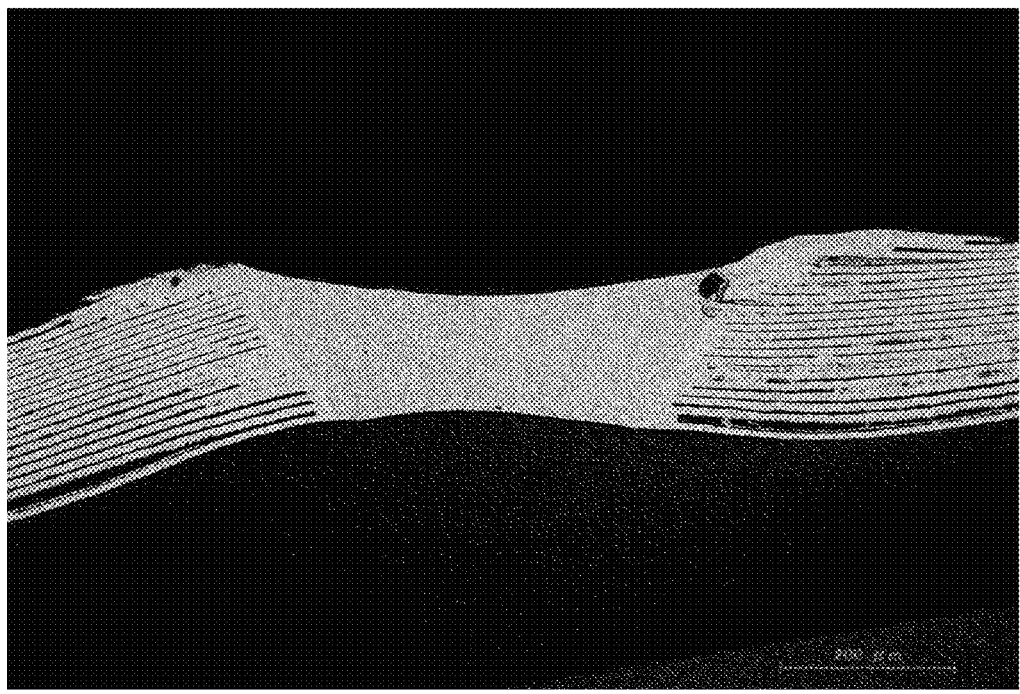
FIG. 6 is a picture of a sectional view of FIG. 5.

FIG. 5 is a picture of a surface and a back surface of the lap-welded copper foils according to the first example. FIG. 6 is a picture of a sectional view of FIG. 5. FIGS. 5 and 6 are the case where the power of the laser light is set as 700 W, and the sweeping speed is set as 5 mm/s. As in FIGS. 5 and 6, lap welding was achieved with high quality without having a hole or a tear generated in the surface and the back surface.

Second Example

Fifty pieces of copper foils with a thickness of 8 μm were stacked to make a workpiece, and laser light was emitted thereto to perform laser welding. The laser light output from a laser device has a Gaussian distribution, and the wavelength thereof is 1070 nm. The power of the laser light was set as 1000 W. Then, the laser light was divided by a diffractive optical element into sixteen beams arranged in a ring-like form of 466 μm in diameter and a single beam disposed in the center thereof as illustrated in FIG. 4D and emitted to the workpiece. The ratio of the power of the beam in the center to the total power of the sixteen beams in the ring-like form was set as 5:5. The sweeping speed of the laser light with respect to the workpiece was set as 5 mm/s.

Figure 7:
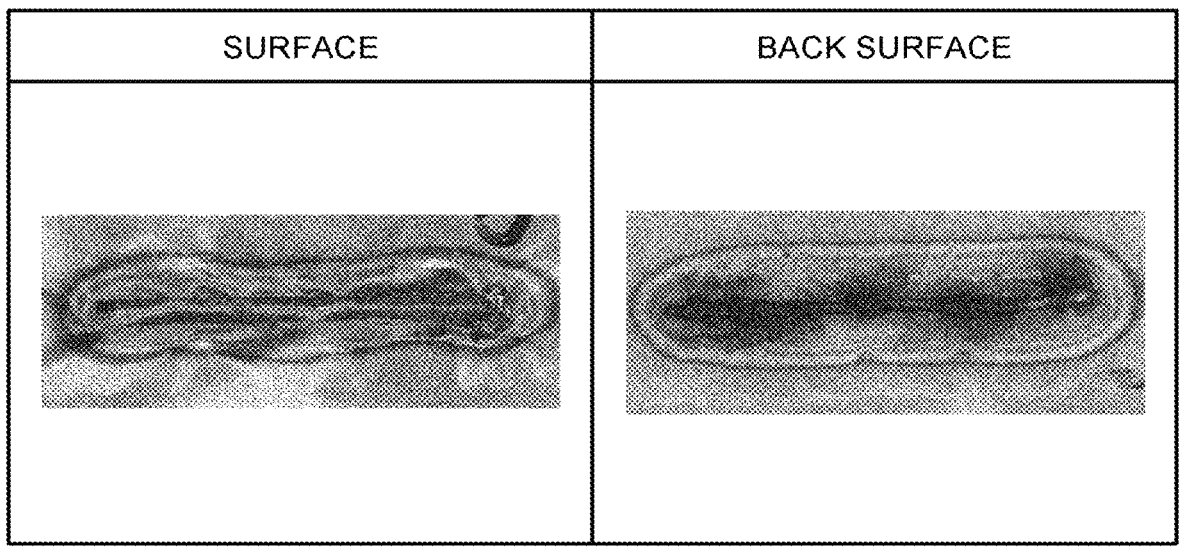
FIG. 7 is a picture of a surface and a back surface of lap-welded copper foils according to a second example.
Figure 8:
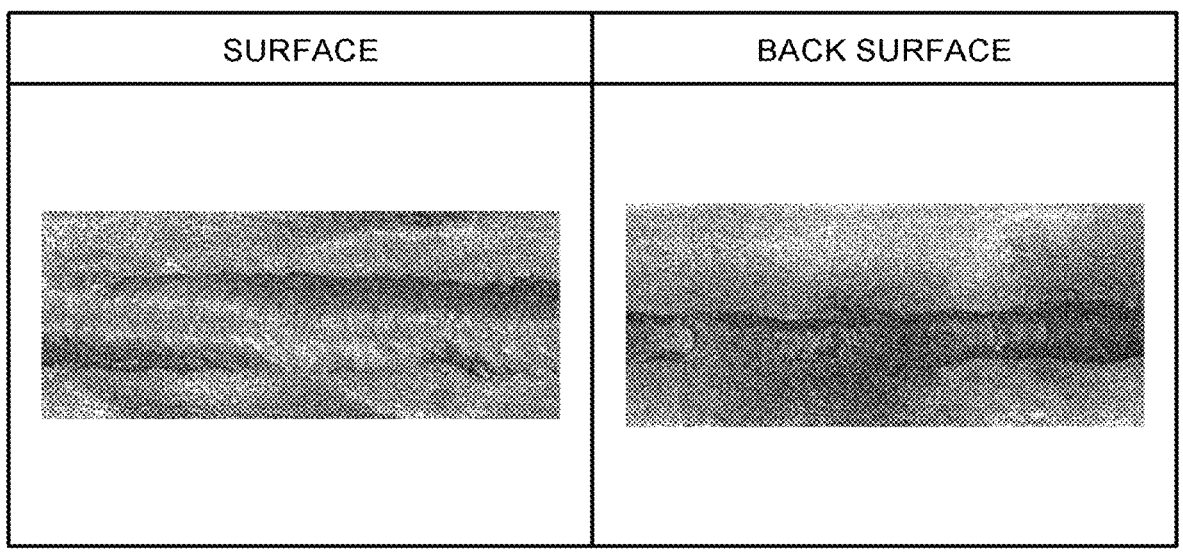
FIG. 8 is a fragmentary enlarged picture of FIG. 7.
Figure 9:
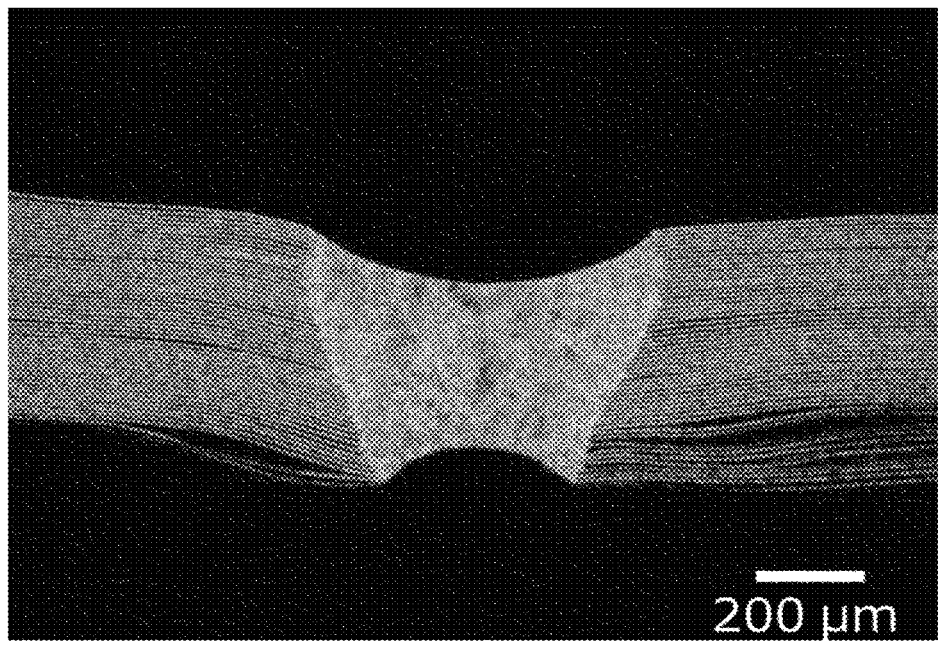
FIG. 9 is a picture of a sectional view of FIG. 7.

FIG. 7 is a picture of the surface and the back surface of the lap-welded copper foils according to the second example. FIG. 8 is a fragmentary enlarged picture of FIG. 7, which is an enlarged view of a weld bead. FIG. 9 is a picture of a sectional view of FIG. 7. As in FIGS. 7, 8, and 9, lap welding was achieved with high quality without having a hole or a tear generated in the surface and the back surface.

Similarly, it was confirmed that lap welding with high quality can be achieved under conditions where the powers of the laser light and the sweeping speeds mentioned above were combined as appropriate. For example, for achieving lap welding with high quality, it was confirmed to be preferable to increase the power of the laser light when the sweeping speed is increased and to decrease the power of the laser light when the sweeping speed is decreased so as to set the energy of the laser light input to the workpiece per unit time to fall within an appropriate range.

Dividing Laser Light

A form for dividing the laser light is not limited to that illustrated in FIG. 3. FIG. 10A to FIG. 10H are schematic diagrams for describing examples where the diffractive optical element 123 divides laser light into a plurality of beams. It is to be assumed that the sweeping direction SD is directed toward the upper side when facing the drawings. In the example illustrated in FIG. 10A, as in the case of FIG. 4D, laser light L1 emitted to the workpiece W includes seventeen beams B1 each being in a Gaussian shape. Sixteen beams B1 are arranged in a ring-like form within a circular area A1 as a prescribed area on the surface of the workpiece W and a single beam B1 is arranged in the center of the ring to be emitted to the area A1. The ratio of the power of the beam B1 in the center to the total power of the sixteen beams B1 in a ring-like form is 1:9, for example. In the example illustrated in FIG. 10B, laser light L2 emitted to the workpiece W includes nine beams B2 each being in a Gaussian shape, which are arranged in a square form within a square area A2 as a prescribed area on the surface of the workpiece W to be emitted to the area A2. In the example illustrated in FIG. 10C, laser light L3 emitted to the workpiece W includes six beams B3 each being in a Gaussian shape, which are arranged in a triangle form within a triangular area A3 as a prescribed area on the surface of the workpiece W to be emitted to the area A3.

Figure 10A:
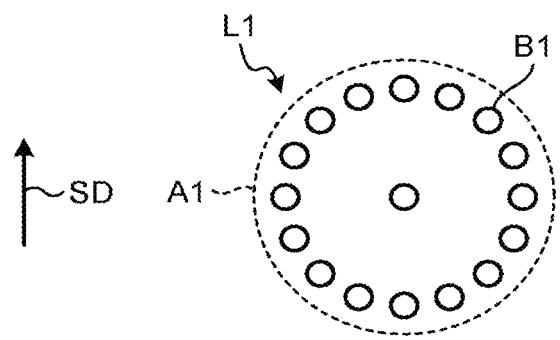
FIG. 10A is a schematic diagram for describing an example where a diffractive optical element divides laser light into a plurality of beams.
Figure 10B:
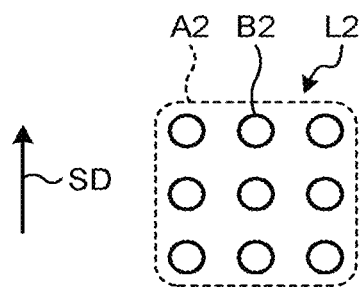
FIG. 10B is a schematic diagram for describing an example where a diffractive optical element divides laser light into a plurality of beams.
Figure 10C:
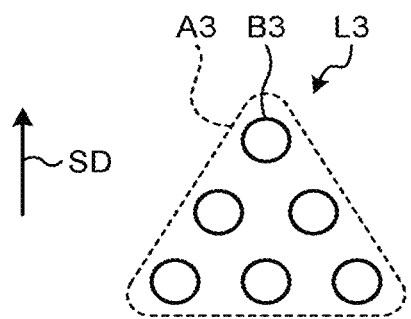
FIG. 10C is a schematic diagram for describing an example where a diffractive optical element divides laser light into a plurality of beams.
Figure 10D:
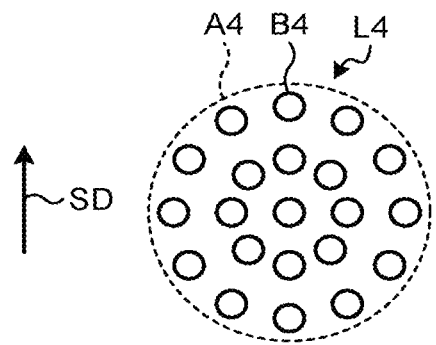
FIG. 10D is a schematic diagram for describing an example where a diffractive optical element divides laser light into a plurality of beams.
Figure 10E:
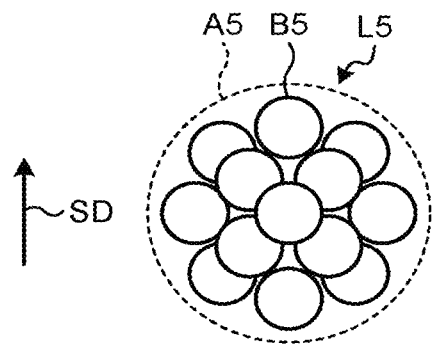
FIG. 10E is a schematic diagram for describing an example where a diffractive optical element divides laser light into a plurality of beams.
Figure 10F:
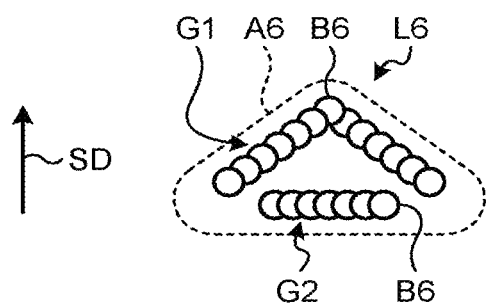
FIG. 10F is a schematic diagram for describing an example where a diffractive optical element divides laser light into a plurality of beams.
Figure 10G:
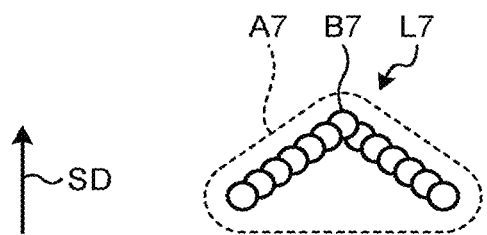
FIG. 10G is a schematic diagram for describing an example where a diffractive optical element divides laser light into a plurality of beams.

In the example illustrated in FIG. 10D, laser light L4 emitted to the workpiece W includes twenty-one beams B4 each being in a Gaussian shape. Twelve beams B4 among those are arranged in a first ring-like form on the outermost circumference within a circular area A4 as a prescribed area on the surface of the workpiece W, eight beams B4 are arranged in a second ring-like form on the inner circumference side of the first ring-like form, and a single beam B4 is arranged in the center of the ring to be emitted to the area A4. In the example illustrated in FIG. 10E, laser light L5 emitted to the workpiece W includes thirteen beams B5 each being in a Gaussian shape. Eight beams B5 among those are arranged in a first ring-like form on the outermost circumference within a circular area A5 as a prescribed area on the surface of the workpiece W, four beams B5 are arranged in a second ring-like form on the inner circumference side of the first ring-like form, and a single beam B5 is arranged in the center of the ring to be emitted to the area A5. Note that some of the beams B5 forming the first ring-like form and forming the second ring-like form overlap with each other. In the example illustrated in FIG. 10F, laser light L6 emitted to the workpiece W includes twenty beams B6 each being in a Gaussian shape. Each of the beams B6 belongs to either a beam group G1 or a beam group G2. The beam group G1 forms a mountain-like shape with its top facing toward the sweeping direction SD, while the beam group G2 is located on the rear side of the beam group G1 and forms a straight line. The beam groups G1 and G2 are arranged within a triangular area A6 as a prescribed area on the surface of the workpiece W to be emitted to the area A6. In the example illustrated in FIG. 10G, laser light L7 emitted to the workpiece W includes thirteen beams B7 each being in a Gaussian shape. The beams B7 form a mountain-like shape similar to that of the beam group G1 of FIG. 10F. The beams B7 are arranged within a triangular area A7 as a prescribed area on the surface of the workpiece W to be emitted to the area A7.

Figure 10H:
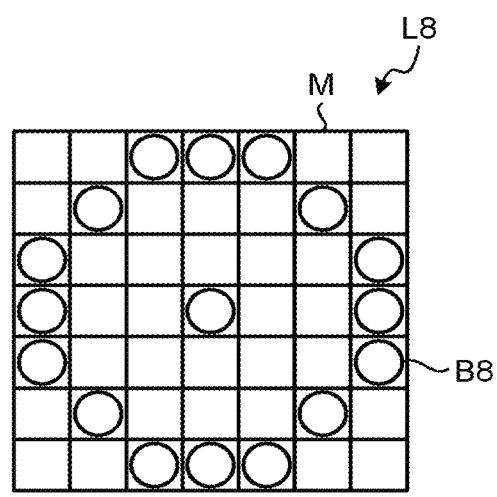
FIG. 10H is a schematic diagram for describing an example where a diffractive optical element divides laser light into a plurality of beams.

In the example illustrated in FIG. 10H, laser light L8 includes seventeen beams B8. Sixteen beams B8 are arranged to form a substantially ring-like form or a substantially octagonal form with a single beam B8 being the center. Furthermore, when a matrix M is defined, the seventeen beams B8 are arranged to fill square grids thereof. As described, the beams may be arranged to fill the grids or may be arranged more flexibly.

In any of the diagrams from FIG. 10A to FIG. 10H, the prescribed area is in a shape corresponding to the outer contour of the shape formed by the beams arranged dispersedly.

Meanwhile, the beams are isotropically arranged in FIG. 3, and FIGS. 10A, 10D, 10E, and 10H, so that there is such an effect that the melting property for the workpiece W does not change even when the sweeping direction is arbitrarily changed.

The examples illustrated in FIGS. 10A to 10H can be achieved by appropriately designing the characteristics of the diffraction gratings configuring the diffractive optical element 123.

Another Example

As another example, welding was performed by combining various conditions. First, twenty pieces of copper foils with a thickness of 8 µm were stacked to make a first workpiece. Furthermore, fifty pieces of copper foils with a thickness of 8 µm were stacked to make a second workpiece. Laser light was emitted to those to perform laser welding. The laser light output from a laser device has a Gaussian distribution, and the wavelength thereof is 1070 nm. The power of the laser light was set as 600 W, 700 W, or 800 W for the first workpiece, and set as 1000 W, 1300 W, or 1500 W for the second workpiece. Then, the laser light was divided by a diffractive optical element into sixteen beams arranged in a ring-like form of 600 µm in diameter and a single beam disposed in the center thereof as illustrated in FIG. 10A and emitted to the workpieces. The ratio of the power of the beam in the center to the total power of the sixteen beams in the ring-like form was set as 1:9 for the first workpiece and set as 5:5 for the second workpiece. The sweeping speed of the laser light with respect to the workpiece was set as 3 mm/s, 5 mm/s, or 10 mm/s for the first workpiece and set as 3 mm/s, 5 mm/s, 10 mm/s, 20 mm/s, 30 mm/s, 60 mm/s, or 100 mm/s for the second workpiece. Furthermore, from weld length l (mm) that is the length of the laser light in the sweeping direction, power p (W) of the laser light, sweeping speed v (mm/s), and thickness d (µm) of the workpiece calculated from the thickness and the number of pieces of the copper foils, the energy (input energy) of the laser light emitted to the workpiece per unit weld length (mm) and per unit thickness (μm), "E=(1/v)*(p/d)(J/(μm*mm))", was calculated. Note that the weld length 1 was set as 10 mm in this example.

Table 1 lists relations between the input energy per unit weld length (mm) and per unit thickness (μm) and welding results thereof according to this example. As for the welding results, a sign "A" indicates that it is in a good welding state throughout the whole weld length, a sign "B" indicates that it is in a good welding state over 2/3 or more of the weld length, and a sign "C" indicates that it is in a good welding state over less than 2/3 of the weld length. It was determined that the welding state was not good in a case where, for example, a through hole opened on the copper foils, a defect such as a non-through hole was observed on the surface, and there was no weld mark on the back surface, that is, there was a foil that was not welded. As in Table 1, it is confirmed that the input energy per unit weld length (mm) and per unit thickness (μm) is preferable to be 0.02 (J/(μm*mm)) or more and 1.67 (J/(μm*mm)) or less, and more preferable to be 0.04 (J/(μm*mm)) or more and 1.46 (J/(μm*mm)) or less.

The optical head 220 includes a diffractive optical element 223 as a beam shaper disposed between the collimating lens 221 and the condenser lens 222. Like the diffractive optical element 123, the diffractive optical element 223 divides the laser light input from the collimating lens 221 into a plurality of beams of equivalent peak powers. Specifically, the diffractive optical element 223 divides the laser light such that the optical head 220 is able to irradiate the surface of the workpiece W with a plurality of beams by dispersing positions such that centers of the beams do not overlap with each other within a prescribed area on the surface. Note that the diffractive optical element 223 is designed to divide the laser light into a plurality of beams as illustrated in FIG. 3 and FIG. 10A to FIG. 10G, for example. Thereby, the laser welding apparatus 200 can perform lap welding on the workpiece W with higher quality. While the diffractive optical element 223 is disposed between the collimating lens 221 and the condenser lens 222 as in the case of the first embodiment, the diffractive optical element

TABLE 1

| | Input energy (J/(μm*mm)) per unit thickness (μm) and unit weld length (mm) | | | | | | | | | | | | | | |
|---|---|---|---|---|---|---|---|---|---|---|---|---|---|---|---|
| | <0.02 | 0.02 | 0.04 | 0.06 | 0.11 | 0.13 | 0.16 | 0.19 | 0.38 | 0.5 | 0.83 | 1.17 | 1.25 | 1.46 | 1.67 | 1.67< |
| Welding result | C | B | A | A | A | A | A | A | A | A | A | A | A | A | B | C |

Second Embodiment

Figure 11:
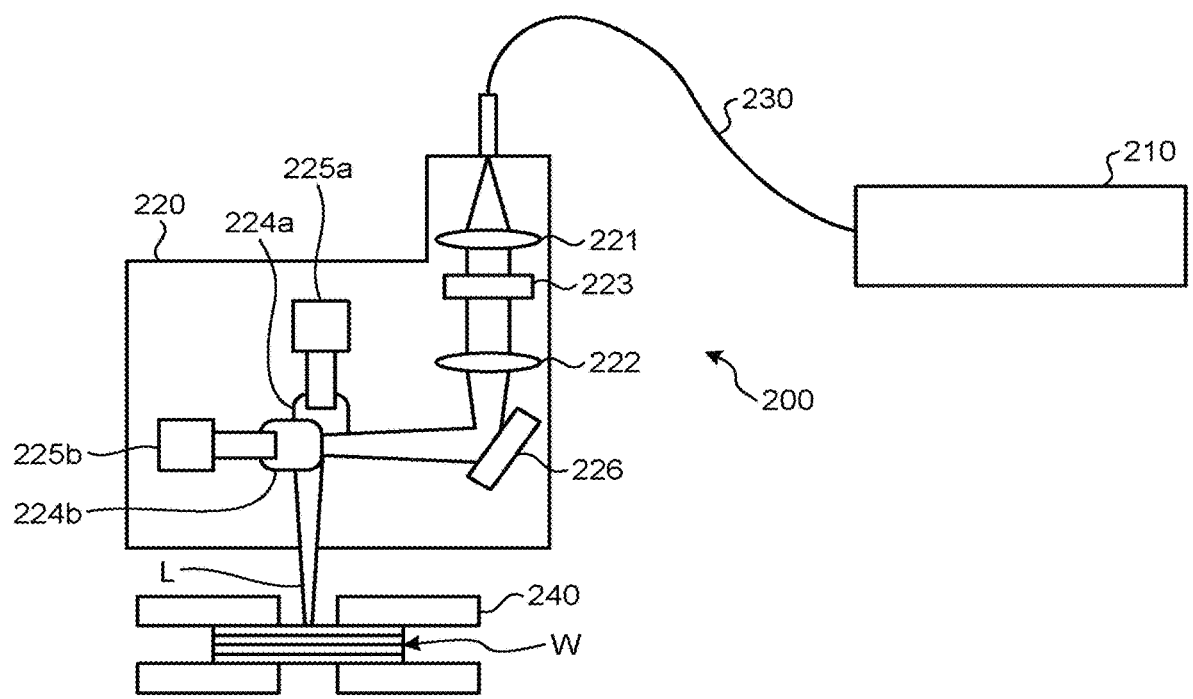
FIG. 11 is a schematic diagram illustrating a schematic configuration of a laser welding apparatus according to a second embodiment.

FIG. 11 is a schematic diagram illustrating a schematic configuration of a laser welding apparatus according to the second embodiment. A laser welding apparatus 200 irradiates the laser light L to the workpiece W for welding the workpiece W. The laser welding apparatus 200 achieves welding by the principle of action similar to that of the laser welding apparatus 100. Therefore, only the device configuration of the laser welding apparatus 200 will be described hereinafter.

The laser welding apparatus 200 includes a laser device 210, an optical head 220, an optical fiber 230, and a fixing device 240.

The laser device 210 is configured like the laser device 110 such that it is able to output the laser light with the power of several kW, for example. The optical fiber 230 guides the laser light output from the laser device 210 to be input to the optical head 220. The fixing device 240 fixes the workpiece W.

Like the optical head 120, the optical head 220 is an optical device for irradiating the workpiece W with laser light input from the laser device 210. The optical head 220 includes a collimating lens 221 and a condenser lens 222.

Furthermore, the optical head 220 includes a galvanoscanner disposed between the condenser lens 222 and the workpiece W. The galvanoscanner is a device capable of sweeping the laser light L by moving the irradiating position of the laser light L without moving the optical head 220 by controlling angles of two mirrors 224a and 224b. The laser welding apparatus 200 includes a mirror 226 for guiding the laser light L emitted from the condenser lens 222 to the galvanoscanner. Furthermore, the angles of the mirrors 224a and 224b of the galvanoscanner are changed by motors 225a and 225b, respectively. The motors 225a and 225b are driven by a driver that is not illustrated.

223 may be placed on the optical fiber 230 side than the collimating lens 221 or on the workpiece W side than the condenser lens 222.

Third Embodiment

Figure 12:
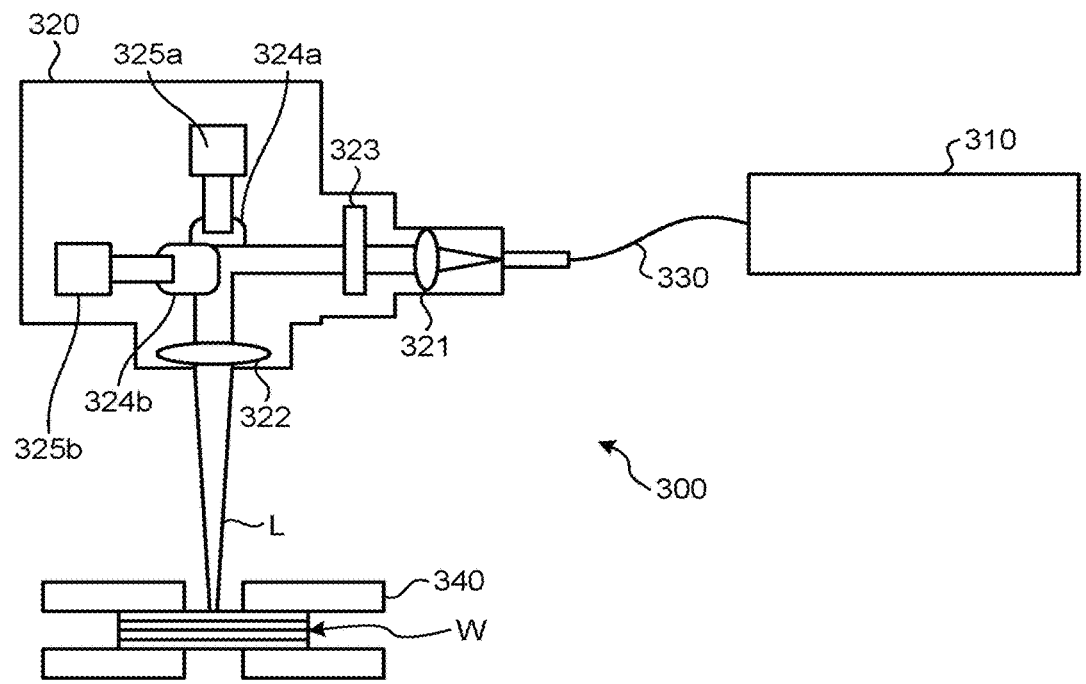
FIG. 12 is a schematic diagram illustrating a schematic configuration of a laser welding apparatus according to a third embodiment.

FIG. 12 is a schematic diagram illustrating a schematic configuration of a laser welding apparatus according to the third embodiment. A laser welding apparatus 300 irradiates the laser light L to the workpiece W for welding the workpiece W. The laser welding apparatus 300 achieves welding by the principle of action similar to those of the laser welding apparatuses 100 and 200. The configuration of the elements (a laser device 310, an optical fiber 330, and a fixing device 340) other than an optical head 320 is the same as the corresponding elements of the laser welding apparatuses 100 and 200. Therefore, only the device configuration of the optical head 320 will be described hereinafter.

Like the optical heads 120 and 220, the optical head 320 is an optical device for irradiating the workpiece W with laser light input from the laser device 310. The optical head 320 includes a collimating lens 321 and a condenser lens 322.

Furthermore, the optical head 320 includes a galvanoscanner disposed between the collimating lens 321 and the condenser lens 322. The angles of mirrors 324a and 324b of the galvanoscanner are changed by motors 325a and 325b, respectively. The motors 325a and 325b are driven by a driver that is not illustrated. In the optical head 320, the galvanoscanner is provided at a position different from that of the optical head 220. However, like the optical head 220, by controlling the angles of the two mirrors 324a and 324b, it is possible to sweep the laser light L by moving the irradiating position of the laser light L without moving the optical head 320.

The optical head 320 includes a diffractive optical element 323 as a beam shaper disposed between the collimating lens 321 and the condenser lens 322. Like the diffractive optical elements 123 and 223, the diffractive optical element 323 divides the laser light input from the collimating lens 321 into a plurality of beams of equivalent peak powers. Specifically, the diffractive optical element 323 divides the laser light such that the optical head 320 is able to irradiate the surface of the workpiece W with a plurality of beams by dispersing positions such that centers of the beams do not overlap with each other within a prescribed area on the surface. Note that the diffractive optical element 323 is designed to divide the laser light into a plurality of beams as illustrated in FIG. 3 and FIG. 10A to FIG. 10G, for example. Thereby, the laser welding apparatus 300 can perform lap welding on the workpiece W with higher quality. While the diffractive optical element 323 is disposed between the collimating lens 321 and the condenser lens 322 as in the case of the first embodiment, the diffractive optical element 323 may be placed on the optical fiber 330 side than the collimating lens 321 or on the workpiece W side than the condenser lens 322.

Fourth Embodiment

Figure 13:
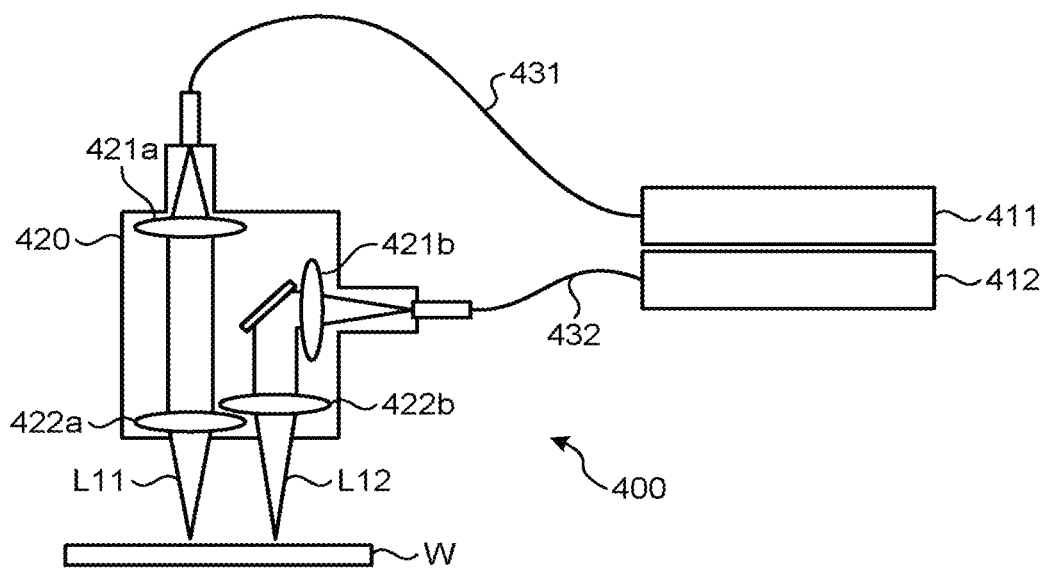
FIG. 13 is a schematic diagram illustrating a schematic configuration of a laser welding apparatus according to a fourth embodiment.

FIG. 13 is a schematic diagram illustrating a schematic configuration of a laser welding apparatus according to a fourth embodiment. A laser welding apparatus 400 irradiates the workpiece W with the laser light for welding the workpiece W. The laser welding apparatus 400 achieves a welding method by the principle of action similar to that of the laser welding apparatuses 100. Therefore, only the device configuration of the laser welding apparatus 400 will be described hereinafter.

The laser welding apparatus 400 includes a plurality of laser devices that output laser light, an optical head 420 that irradiates the workpiece W with the laser light, and a plurality of optical fibers that guide the laser light output from the laser devices to the optical head 420. In the drawing, two laser devices 411 and 412 among the laser devices are illustrated, and optical fibers 431 and 432 among the optical fibers are illustrated.

The laser device 411 is configured like the laser device 110 such as to be able to output multi-mode laser light L11 with the power of several kW, for example. The laser device 412 is configured like the laser device 110 such as to be able to output laser light L12 that is a plurality of beams of laser light each being a multi-mode with the power of several kW, for example. The other laser devices are also configured like the laser device 110.

The optical fibers 431 and 432 guide the laser light L11 and the laser light L12 to the optical head 420, respectively. The other optical fibers are the same. The optical fibers may be replaced with a multi-core fiber.

The optical head 420 is an optical device for emitting the laser light such as each of the laser light L11 and the laser light L12 guided from the laser devices including the laser devices 411 and 412 toward the workpiece W. The optical head 420 includes a collimating lens 421a and a condenser lens 422a for the laser light L11, a collimating lens 421b and a condenser lens 422b for the laser light L12, and collimating lenses and condenser lenses for remaining laser light. Each of the collimating lenses such as the collimating lenses 421a and 421b is an optical system for making the laser light guided by the optical fiber 431, 432, or the like into collimated light once. The condenser lenses such as the condenser lenses 422a and 422b are optical systems for condensing the collimated laser light to the workpiece W. Note that each of the collimating lens and the condenser lens may be configured with a plurality of lenses so as to collimate or condense a plurality of beams of laser light.

The optical head 420 emits a plurality of beams of laser light including the laser light L11 and the laser light L12 to the workpiece W. That is, the laser light emitted toward the workpiece W contains a plurality of beams. It is preferable to set each of the beams to have a power density with which no hole opens in each of the metal foils configuring the workpiece W. Furthermore, it is preferable to set the power density of the beams and to disperse the irradiating positions thereof to be emitted so as to form a weld pool in the workpiece W through to the back surface by the beams. However, it is preferable to set the power density of the beams, the irradiating positions, and the like such that the molten metal does not drop from the back surface side of the workpiece.

With the laser welding device 400, it is possible to achieve the layout illustrated in FIG. 3 and FIG. 10A to FIG. 10H. Note that the number of beams may be increased or decreased as appropriate.

Fifth Embodiment

Figure 14:
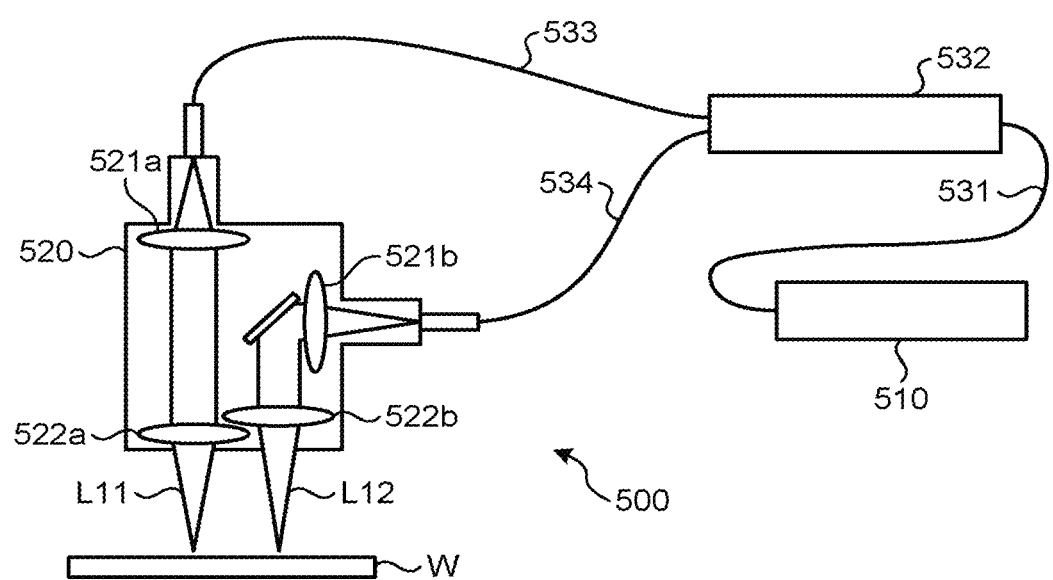
FIG. 14 is a schematic diagram illustrating a schematic configuration of a laser welding apparatus according to a fifth embodiment.

FIG. 14 is a schematic diagram illustrating a schematic configuration of a laser welding apparatus according to a fifth embodiment. A laser welding apparatus 500 irradiates the workpiece W with the laser light for welding the workpiece W. The laser welding apparatus 500 achieves a welding method by the principle of action similar to that of the laser welding apparatuses 100. Therefore, only the device configuration of the laser welding apparatus 500 will be described hereinafter.

The laser welding apparatus 500 includes a laser device 510 that outputs laser light, an optical head 520 that irradiates the workpiece W with the laser light, and a plurality of optical fibers that guide the laser light output from the laser device 510 to the optical head 520. In the drawing, optical fibers 531, 533, and 534 among the optical fibers are illustrated.

The laser device 510 is configured like the laser device 110 such as to be able to output multi-mode laser light with the power of several kW, for example. The laser device 510 is used for outputting a plurality of beams of laser light to be emitted to the workpiece W. For that, in regards to the optical fibers that guide the laser light output from the laser device 510 to the optical head 520, a branch unit 532 is provided between the optical fibers including the optical fiber 531 and the optical fibers 533 and 534. The laser device 510 is configured to branch the laser light output from the laser device 510 into a plurality of beams of laser light and then guide to the optical head 520.

The optical fibers including the optical fibers 531 and 533 guide the laser light to the optical head 520, respectively. The optical fibers may be replaced with a multi-core fiber.

The optical head 520 is an optical device for emitting, to the workpiece W, a plurality of beams of laser light including the laser light L11 and the laser light L12 branched by the branch unit 532 and guided by the optical fibers including the optical fibers 531 and 533. Thus, the optical head 520 includes a collimating lens 521a and a condenser lens 522a for the laser light L11, a collimating lens 521b and a condenser lens 522b for the laser light L12, and collimating lenses and condenser lenses for the others. Each of the collimating lenses 521a and 521b is an optical system for making the laser light guided by the optical fiber 533, 534, or the like into collimated light once. The condenser lenses 522a, 522b and the like are optical systems for condensing the collimated laser light to the workpiece W. Note that each of the collimating lens and the condenser lens may be configured with a plurality of lenses so as to collimate or condense a plurality of beams of laser light.

The optical head 520 emits a plurality of beams of laser light including the laser light L11 and the laser light L12 to the workpiece W. That is, the laser light emitted toward the workpiece W contains a plurality of beams. Furthermore, it is preferable to set the power density of the beams and to disperse the irradiating positions thereof to be emitted so as to form a weld pool in the workpiece W through to the back surface by the beams. However, it is preferable to set the power density of the beams, the irradiating positions and the like such that the molten metal does not drop from the back surface side of the workpiece.

With the laser welding apparatus 500, it is possible to achieve the layout illustrated in FIG. 3 and FIG. 10A to FIG. 10H. In the examples illustrated in the drawings, the number of beams may be increased or decreased as appropriate.

Sixth Embodiment

Figure 15:
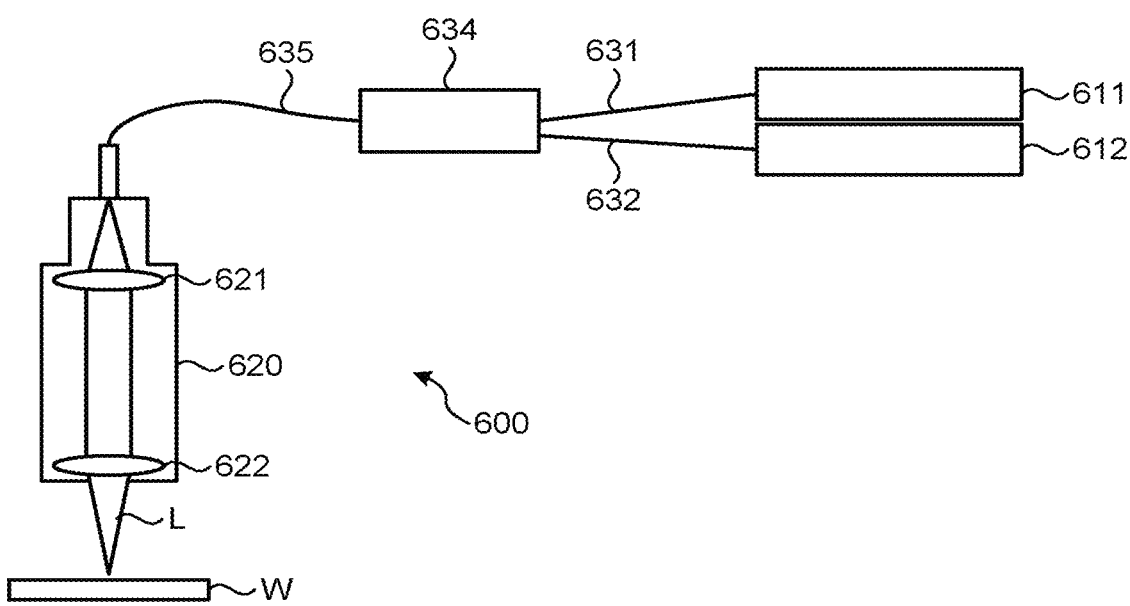
FIG. 15 is a schematic diagram illustrating a schematic configuration of a laser welding apparatus according to a sixth embodiment.

FIG. 15 is a schematic diagram illustrating a schematic configuration of a laser welding apparatus according to a sixth embodiment. A laser welding apparatus 600 irradiates the workpiece W with the laser light L for welding the workpiece W. The laser welding apparatus 600 achieves a welding method by the principle of action similar to that of the laser welding apparatuses 100. Therefore, only the device configuration of the laser welding apparatus 600 will be described hereinafter.

The laser welding apparatus 600 includes a plurality of laser devices that output laser light, an optical head 620 that irradiates the workpiece W with the laser light, and a plurality of optical fibers that guide the laser light output from the laser devices to the optical head 620. In the drawing, laser devices 611 and 612 among the laser devices are illustrated, and optical fibers 631, 632, and 635 among the optical fibers are illustrated.

The laser device 611 is configured like the laser device 110 such as to be able to output multi-mode laser light with the power of several kW, for example. The laser device 612 is configured like the laser device 110 such as to be able to output laser light that is a plurality of beams of laser light each being a multi-mode with the power of several kW, for example. Other laser devices are also configured like the laser device 110.

In the laser welding apparatus 600, the laser light output from the laser devices including the laser devices 611 and 612 is coupled before being guided to the optical head 620. For that, a coupling unit 634 is provided between the optical fiber 635 and the optical fibers including the optical fibers 631 and 632 that guide the laser light output from the laser devices including the laser devices 611 and 612 to the optical head 620. The laser light output from the laser devices including the laser devices 611 and 612 is guided in parallel through the optical fiber 635.

Figure 16A:
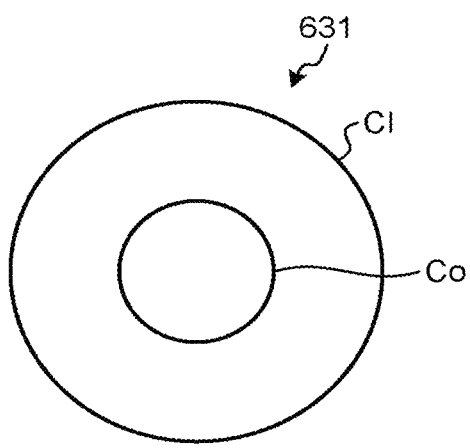
FIG. 16A is a diagram illustrating a structural example of an optical fiber.

Here, structural examples of the optical fiber 631 (and 632) and the optical fiber 635 will be described by referring to FIG. 16A and FIG. 16B. As illustrated in FIG. 16A, the optical fiber 631 (and 632) is a regular optical fiber. That is, the optical fiber 631 (and 632) is an optical fiber in which, around a single core area Co, a clad Cl having a lower refractive index than that of the core area Co is formed. The other optical fibers provided between the laser devices other than the laser devices 611 and 612 and the coupling unit 634 are also regular optical fibers like the optical fiber 631.

Figure 16B:
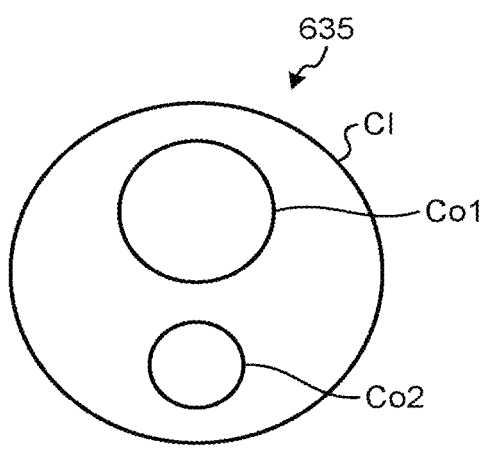
FIG. 16B is a diagram illustrating a structural example of an optical fiber.

Meanwhile, as illustrated in FIG. 16B, the optical fiber 635 is a multi-core fiber. That is, the optical fiber 635 has a plurality of core areas and a clad Cl having a lower refractive index than those of the core areas is formed around the core areas. In the drawing, two core areas Co1 and Co2 are illustrated. Furthermore, the core area Co2 includes a plurality of core areas. Furthermore, in the coupling unit 634, the core areas of the optical fibers connected to each of a plurality of laser devices and each of the core areas of the optical fiber 635 are coupled. Each of the laser light output from the laser devices is guided by each of the core areas of the core area Co2.

Referring back to FIG. 15, the optical head 620 is an optical device for emitting the laser light L coupled by the coupling unit 634 to the workpiece W. For that, the optical head 620 includes, inside thereof, a plurality of collimating lenses including a collimating lens 621 and a plurality of condenser lenses including a condenser lens 622.

In the laser welding apparatus 600, the optical head 620 does not include a diffractive optical element and independent optical systems for a plurality of beams of laser light. However, the laser light output from each of the laser devices is coupled before being guided to the optical head 620. Thereby, the laser light L emitted toward the workpiece W contains a plurality of beams. Further, it is preferable to set the power density of the beams and to disperse the irradiating positions thereof to be emitted so as to form a weld pool in the workpiece W through to the back surface by the beams. However, it is preferable to set the power density of the beams, the irradiating positions, and the like such that the molten metal does not drop from the back surface side of the workpiece.

With the laser welding apparatus 600, it is possible to achieve the layout illustrated in FIG. 3 and FIG. 10A to FIG. 10H. Note that the number of beams may be increased or decreased as appropriate.

Note that the diffractive optical elements in the embodiments described above divide laser light into a plurality of beams of equivalent peak powers. However, the peak powers of the beams may not have to be equivalent. That is, it is fine if there is no beam with a peak that is prominent to such an extent that a hole, a tear, and the like are generated in the metal foils. Furthermore, the power distribution of each of the beams is not limited to be in a Gaussian shape but may be in other unimodal shapes.

Furthermore, when sweeping the laser light L for the workpiece W, sweeping by known wobbling or weaving may be performed.

While the workpiece in the embodiments is configured only with a plurality of metal foils, it is also possible to configure a workpiece by stacking a plurality of metal foils and further stacking a metal sheet of 100 μm or more in thickness thereto. The metal sheet includes copper or aluminum, for example.

Furthermore, the laser light to be used is not limited to be of a multi-mode, but laser light of a single mode may be used as well.

The cases of sweeping the laser light with respect to the workpiece are described above. However, to form the laser light with a plurality of beams, to set each of the beams to have the power density with which no hole opens in the metal foils, and to set the power density of the beams and disperse the irradiating positions to be emitted so as to form a weld pool in the workpiece therethrough are effective also in a case of welding such as spot welding in which laser light is not swept with respect to the workpiece.

Furthermore, the present invention is not limited by the embodiments described above. The present invention includes the configurations acquired by combining as appropriate the structural elements of each of the above-described embodiments. Furthermore, those skilled in the art can easily derive more effects and modification examples. Therefore, still broader aspects of the present invention are not limited to the embodiments described above, but various modifications are possible.

The present invention is suitably applied to lap welding of metal foils.

The present invention is capable of providing such an effect that it is possible to achieve lap welding with higher quality.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A welding method, comprising:
preparing a workpiece formed by stacking a plurality of metal foils,
providing a fixing device configured to sandwich the workpiece from a top surface side and a back surface side of the workpiece to fix the workpiece in a flat state, the fixing device having openings through which a top surface portion and a back surface portion of the plurality of metal foils are exposed when the workpiece is sandwiched by the fixing device, the top surface portion of the plurality of metal foils being exposed to be irradiated with laser light that contains a plurality of beams, the back surface portion of the plurality of metal foils being opposed to the top surface portion of the plurality of metal foils, the opening being either holes or grooves,
sandwiching the workpiece from the top surface side and the back surface side of the workpiece by the fixing device to fix the workpiece in the flat state, thereby disposing the top surface portion of the plurality of metal foils in an area to be irradiated with the laser light;
irradiating a surface of the workpiece with the beams of the laser light by dispersing positions of the beams such that centers of the beams do not overlap with each other within a prescribed area on the surface;
melting an irradiated part of the workpiece and performing welding; and
setting each of the beams to have a power density with which no hole opens in the metal foils, and setting the power density of the beams and dispersing irradiating positions to be emitted such that a weld pool penetrating the workpiece is formed by the beams and a molten metal of the weld pool does not drop from the back surface side of the workpiece.

2. The welding method according to claim 1, further comprising setting at least one selected from the number of the beams, peak powers, layout of the irradiating positions, and a shape of the prescribed area according to a characteristic of the workpiece.

3. The welding method according to claim 1, further comprising relatively moving the beams and the workpiece while emitting the laser light toward the workpiece to sweep the laser light on the workpiece.

4. The welding method according to claim 1, wherein the metal foils include copper.

5. The welding method according to claim 1, wherein the beams emitted to the workpiece are generated by a beam shaper that is capable of dividing the laser light into the beams.

6. The welding method according to claim 5, wherein the beam shaper is a diffractive optical element.

7. The welding method according to claim 1, wherein an energy of the laser light emitted to the workpiece per unit thickness ($\mu$m) and per unit weld length (mm) of the workpiece is 0.02 (J/$\mu$m*mm) or more and 1.67 (J/$\mu$m*mm) or less.

8. The welding method according to claim 1, wherein an energy of the laser light emitted to the workpiece per unit thickness ($\mu$m) and per unit weld length (mm) of the workpiece is 0.04 (J/$\mu$m*mm) or more and 1.46 (J/$\mu$m*mm) or less.

* * * * *